(12) United States Patent
Maly

(10) Patent No.: US 7,380,375 B2
(45) Date of Patent: Jun. 3, 2008

(54) ALARM SYSTEM FOR A LOADING DOCK

(75) Inventor: Paul J. Maly, Mequon, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 101 days.

(21) Appl. No.: 11/011,721

(22) Filed: Dec. 14, 2004

(65) Prior Publication Data
US 2006/0137261 A1    Jun. 29, 2006

(51) Int. Cl.
*G08B 13/00* (2006.01)
*G08B 21/00* (2006.01)

(52) U.S. Cl. .................... 52/173.1; 340/524; 340/540; 340/541

(58) Field of Classification Search ............... 52/173.1, 52/173.2, 173.3; 109/2, 3, 5–11, 21; 340/524, 340/540–541, 550, 590, 564, 566, 596, 598, 340/665–668, 683; 256/8, 10, 34
See application file for complete search history.

(56) References Cited

U.S. PATENT DOCUMENTS

| 209,257 A | 10/1878 | Hadley et al. |
|---|---|---|
| 218,546 A | 8/1879 | McAneny |
| 516,486 A | 3/1894 | Hartshorn |
| 774,881 A | 11/1904 | Ingersoll |
| 778,228 A | 12/1904 | Dodge et al. |
| 824,930 A | 7/1906 | Hopkins |
| 859,489 A | 7/1907 | Donovan |
| 1,120,055 A | 12/1914 | Hart et al. |
| 1,368,844 A | 2/1921 | Sawin |
| 1,477,159 A | 12/1923 | Zinser |
| 1,652,186 A | 12/1927 | Strauss |
| 1,666,508 A | 4/1928 | Sawyer |
| 1,698,424 A | 1/1929 | Banschbach |
| 1,828,296 A | 10/1931 | Sawyer |
| RE18,940 E | 9/1933 | Traut |
| 2,088,046 A | 7/1937 | White |
| 2,282,914 A | 5/1942 | Vetterlein |
| 2,295,205 A | 9/1942 | Fraser |
| 2,563,770 A | 8/1951 | Yantes et al. |
| 2,563,894 A | 8/1951 | White |

(Continued)

OTHER PUBLICATIONS

Patent Cooperation Treaty, "International Search Report" for PCT/US05/09600 mailed on Jun. 26, 2006, 2 pages.

(Continued)

*Primary Examiner*—Jeanette Chapman
(74) *Attorney, Agent, or Firm*—Hanley, Flight & Zimmerman LLC

(57) ABSTRACT

A safety system for a truck doorway such as a loading dock with an elevated platform provides an alarm that warns of a falling hazard that may exist due to the dock door being open while a truck is not present at the dock. In cases where a dock's open doorway is protected by a barrier that can be opened or closed, the alarm can be de-activated by closing the barrier. In some embodiments, the safety system includes a remote body sensor that detects when someone or something is near the doorway. In response to the body sensor, a second, more pronounced alarm can warn of more imminent danger where someone on the platform may be too close to an open doorway when a truck is not present.

12 Claims, 12 Drawing Sheets

U.S. PATENT DOCUMENTS

| | | | |
|---|---|---|---|
| 2,678,691 A | | 5/1954 | Rust |
| 2,807,107 A | | 9/1957 | Goulet |
| 2,956,518 A | | 10/1960 | Sabol et al. |
| 3,090,425 A | | 5/1963 | Carlo |
| 3,115,182 A | | 12/1963 | Bobbitt |
| 3,146,824 A | | 9/1964 | Veilleux |
| 3,314,468 A | | 4/1967 | Riedel |
| 3,352,059 A | | 11/1967 | Metz |
| 3,394,497 A | | 7/1968 | Case |
| 3,581,798 A | | 6/1971 | Malamed |
| 3,803,943 A | | 4/1974 | Woloszyk |
| 3,855,733 A | | 12/1974 | Miller |
| 3,886,851 A | | 6/1975 | Berner |
| 4,051,336 A | | 9/1977 | Miller |
| 4,122,629 A | | 10/1978 | Rennick |
| 4,356,668 A | | 11/1982 | Wagner |
| 4,519,164 A | | 5/1985 | Porter |
| 4,658,543 A | | 4/1987 | Carr |
| 4,750,295 A | | 6/1988 | Court et al. |
| 4,772,875 A | * | 9/1988 | Maddox et al. ............. 340/522 |
| 4,782,628 A | | 11/1988 | Gaddis |
| 4,796,385 A | | 1/1989 | Tyler |
| 4,800,366 A | * | 1/1989 | Husmann ................... 340/524 |
| 4,844,567 A | | 7/1989 | Chalabian |
| 4,903,009 A | * | 2/1990 | D'Ambrosia et al. ....... 340/556 |
| 4,927,198 A | | 5/1990 | Fennell et al. |
| 4,934,203 A | | 6/1990 | Bailey et al. |
| 4,949,074 A | * | 8/1990 | D'Ambrosia et al. ....... 340/552 |
| 4,986,031 A | | 1/1991 | Agnew et al. |
| 5,005,827 A | | 4/1991 | Steinbrecher |
| 5,027,552 A | | 7/1991 | Miller et al. |
| 5,029,819 A | | 7/1991 | Kane |
| 5,050,846 A | | 9/1991 | Goodman |
| 5,078,197 A | | 1/1992 | Weishar |
| 5,118,056 A | | 6/1992 | Jeanise |
| 5,170,829 A | | 12/1992 | Duncan et al. |
| 5,271,183 A | | 12/1993 | Hahn et al. |
| 5,299,386 A | | 4/1994 | Naegelli |
| 5,353,859 A | | 10/1994 | Oltahfer |
| 5,459,963 A | | 10/1995 | Alexander |
| 5,503,211 A | | 4/1996 | Engi |
| 5,505,244 A | | 4/1996 | Thumann |
| 5,564,238 A | | 10/1996 | Ellis |
| 5,624,203 A | | 4/1997 | Jackson et al. |
| 5,636,679 A | | 6/1997 | Miller et al. |
| 5,649,396 A | | 7/1997 | Carr |
| 5,660,144 A | | 8/1997 | Venti |
| 5,690,317 A | | 11/1997 | Sandsborg |
| 5,752,557 A | | 5/1998 | Crider |
| 5,823,705 A | | 10/1998 | Jackson et al. |
| 5,875,597 A | | 3/1999 | Gingrich et al. |
| 6,056,038 A | | 5/2000 | Foster et al. |
| 6,186,274 B1 | | 2/2001 | Reynolds et al. |
| 6,215,396 B1 | * | 4/2001 | Script ...................... 340/545.1 |
| 6,244,324 B1 | | 6/2001 | Quates et al. |
| 6,279,276 B1 | | 8/2001 | Knoll |
| 6,288,651 B1 | * | 9/2001 | Souza ........................ 340/933 |
| 6,375,164 B1 | | 4/2002 | Siegler et al. |
| 6,375,165 B1 | | 4/2002 | Sherratt et al. |
| 6,485,225 B1 | | 11/2002 | Baker |
| 6,536,502 B2 | | 3/2003 | Britto et al. |
| 6,542,078 B2 | * | 4/2003 | Script et al. ............. 340/545.1 |
| 6,561,137 B2 | * | 5/2003 | Oakman ..................... 119/721 |
| 6,569,028 B1 | * | 5/2003 | Nichols et al. ............. 473/192 |
| 6,575,435 B1 | | 6/2003 | Kotzen |
| 6,583,720 B1 | * | 6/2003 | Quigley ...................... 340/521 |
| 6,595,496 B1 | | 7/2003 | Langlie et al. |
| 6,634,139 B1 | | 10/2003 | Metz |
| 6,688,480 B1 | | 2/2004 | Denny |
| 6,715,973 B2 | | 4/2004 | Faber et al. |
| 6,733,204 B1 | | 5/2004 | Paniccia |
| 6,776,398 B1 | | 8/2004 | Tsai |
| 6,779,581 B2 | | 8/2004 | Towley |
| 6,807,999 B1 | | 10/2004 | Bowen et al. |
| 6,830,236 B2 | | 12/2004 | Lorenzo |
| 6,940,405 B2 | * | 9/2005 | Script et al. ............. 340/545.1 |
| 6,980,117 B1 | * | 12/2005 | Kirkland et al. ......... 340/545.1 |
| 7,034,682 B2 | * | 4/2006 | Beggs et al. ............. 340/545.1 |
| 7,045,764 B2 | * | 5/2006 | Beggs et al. ................ 250/221 |
| 7,141,450 B2 | * | 11/2006 | Pardo ........................ 438/108 |
| 2002/0170688 A1 | | 11/2002 | Daus et al. |
| 2003/0016996 A1 | | 1/2003 | Gelfand et al. |
| 2003/0079845 A1 | | 5/2003 | Stem, Jr. |
| 2003/0111657 A1 | | 6/2003 | Green |

OTHER PUBLICATIONS

Patent Cooperation Treaty, "Written Opinion" for PCT/US05/09600 mailed on Jun. 26, 2006. 3 pages.

Web page advertising DockStrap(TM) product from Gaylord Material Handling, dated May 14, 2002, 1 page.

Product Brochure showing safety products of JD Metalworks, dated Jul. 9, 2003, 8 pages.

Patent Cooperation Treaty, "International Search Report" for PCT/US05/45451 mailed on Oct. 31, 2006. 3 pages.

Patent Cooperation Treaty, "Written Opinion" for PCT/US05/45451 mailed on Oct. 31, 2006. 4 pages.

Patent Cooperation Treaty, International Search Report for PCT/US05/45451, dated Oct. 31, 2006.

Patent Cooperation Treaty, Written Opinion for PCT/US05/45451, dated Oct. 31, 2006.

International Bureau, "International Preliminary Report on Patentability," PCT application No. PCT/US2005/045451, mailed Jun. 28, 2007, 4 pages.

* cited by examiner

ALARM SYSTEM FOR A LOADING DOCK

BACKGROUND OF THE INVENTION

1. Field of the Invention

The subject invention generally pertains to truck loading docks and more particularly to an alarm system for such a dock.

2. Description of Related Art

Many buildings may have a doorway with a loading dock to facilitate transferring cargo between a truck and the building. A loading dock is a platform that is generally at the same elevation as the bed of the truck or its trailer. The dock may also include a dock leveler, which is a vertically movable ramp that compensates for a height differential that may exist between the platform and the truck bed. Dock levelers may also provide a bridge across which personnel and material handling equipment can travel between the platform and the truck.

For protection against weather and theft, the doorway of the building may include a manual or power operated door. Doors for loading docks usually open and close by moving vertically so as not to interfere with the rear of the truck or interfere with cargo and activity just inside the doorway; however, other types of doors can be used.

When there is no truck at the dock and the weather is mild, the door may be left open to help ventilate the building with fresh outside air. Leaving the door open, unfortunately, increases the risk of personnel or material handling or other equipment inside the building from accidentally falling off the edge of the dock's platform and through the open doorway to the driveway. In addition, the door being left open decreases building security due to entrance of unauthorized personnel or employee theft via the unsecured doorway.

To provide ventilation through the doorway while minimizing the falling hazard, some loading docks include a runoff barrier that provides an obstruction across the doorway when a truck is not present or otherwise moves to a nonblocking position as needed. Examples of such barriers are disclosed in U.S. Pat. Nos. 5,271,183 and 5,299,386.

What is lacking with current loading dock systems, with or without an additional barrier, is a means for warning dockworkers inside the building when a falling hazard exists due to the building's door or barrier being open while there is no truck present at the dock.

SUMMARY OF THE INVENTION

In some embodiments, a safety system for a building's loading dock warns dockworkers inside the building when a falling hazard exists due to the door or barrier being open while there is no truck present at the dock.

In some embodiments, the dock includes a barrier in addition to a door, and in other embodiments the door itself serves as a barrier and the additional barrier is omitted.

In some embodiments, the barrier is attached to the door, and in other embodiments the barrier is mounted separate from the door.

In some embodiments, a sensor determines whether a truck or other type of vehicle is within a certain distance of the doorway, for example, wherein the certain distance is sufficient for the lip of a dock leveler to rest upon the truck bed.

In some embodiments, a sensor determines whether a truck or other type of vehicle is within a certain distance of the doorway, wherein the certain distance is sufficient for a vehicle restraint to engage a truck's ICC bar (rear impact guard).

In some embodiments, a sensor determines whether a body crosses a line of sight to enter a certain area or come within a certain distance of the doorway.

In some embodiments, a remote body sensor in the form of a strain gage or scale associated with a dock leveler determines when the weight of a person or object is in on the dock leveler's deck, whereby the sensor can determine whether the body is near the doorway.

In some embodiments, the safety system is unresponsive to a remote body sensor when the door is closed.

In some embodiments, the safety system uses both visual and audible alarms to signify different levels of possible danger.

In some embodiments, the safety system provides a timestamp that identifies when a hazardous situation may have occurred.

DESCRIPTION OF THE PREFERRED EMBODIMENT

Figure 1:
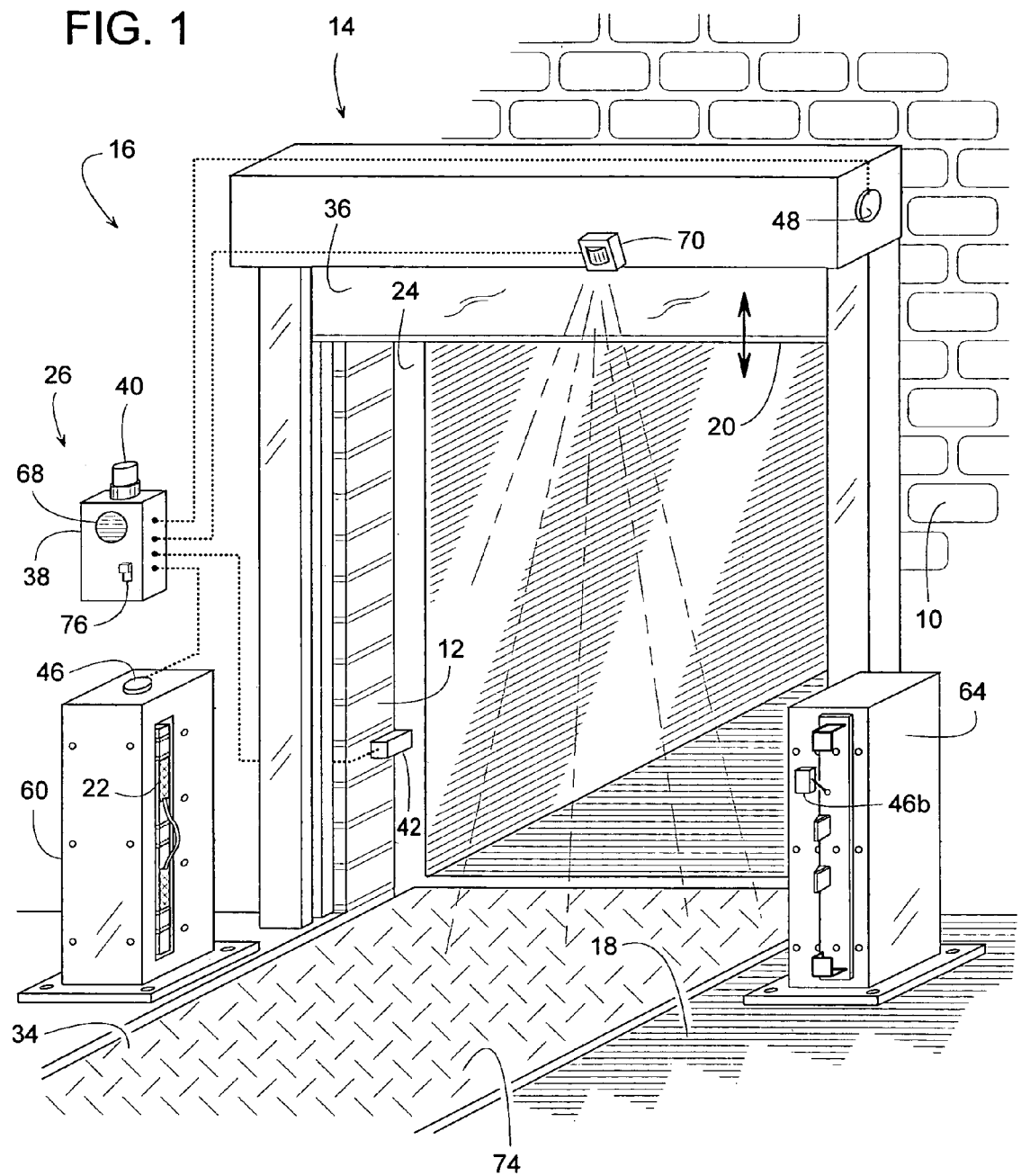
FIG. 1 is a perspective view of a safety system, wherein the view is from inside a building looking at a loading dock whose door and barrier are open while a truck is present at the dock.
Figure 2:
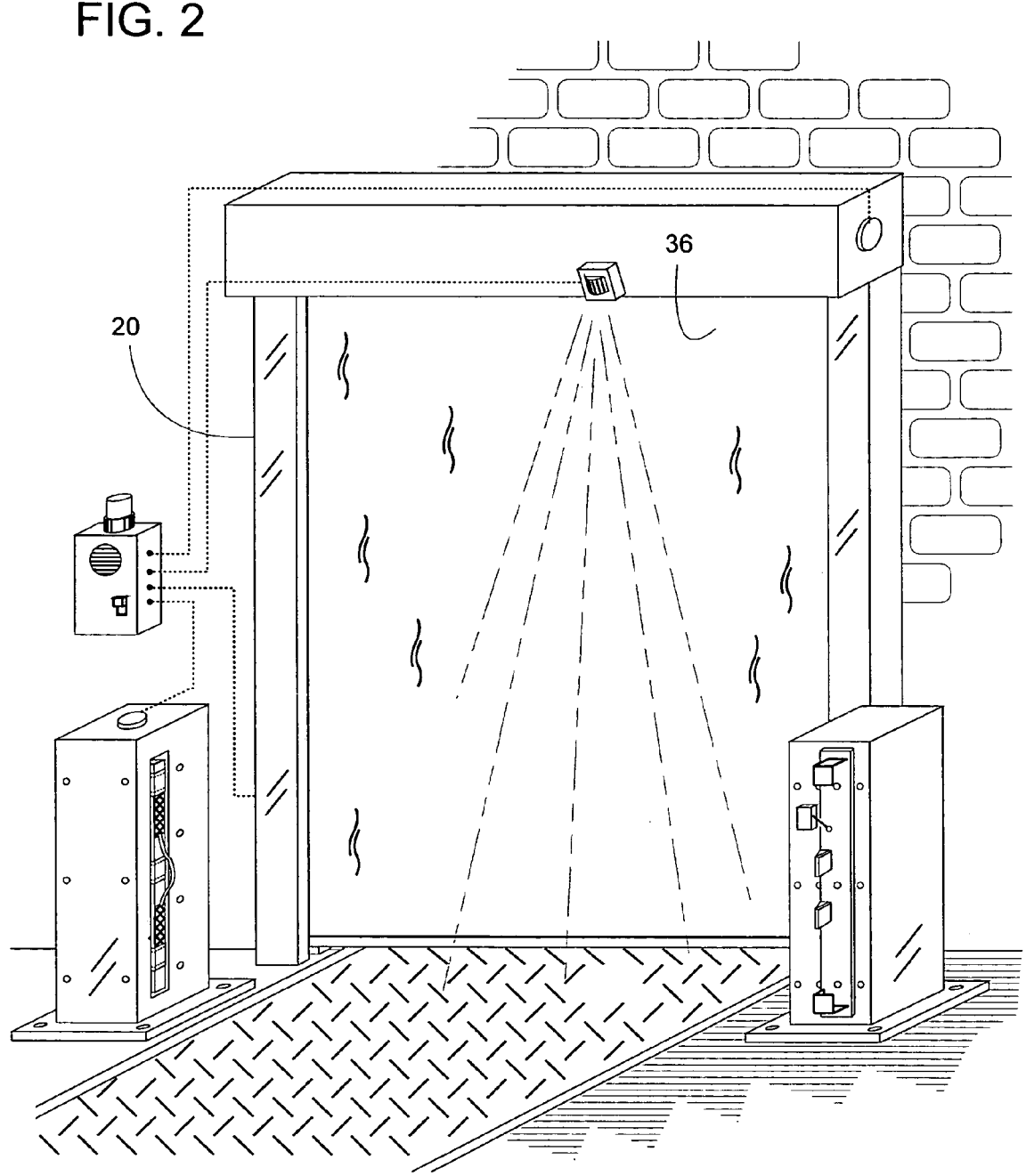
FIG. 2 is similar to FIG. 1 but showing the door closed.
Figure 3:
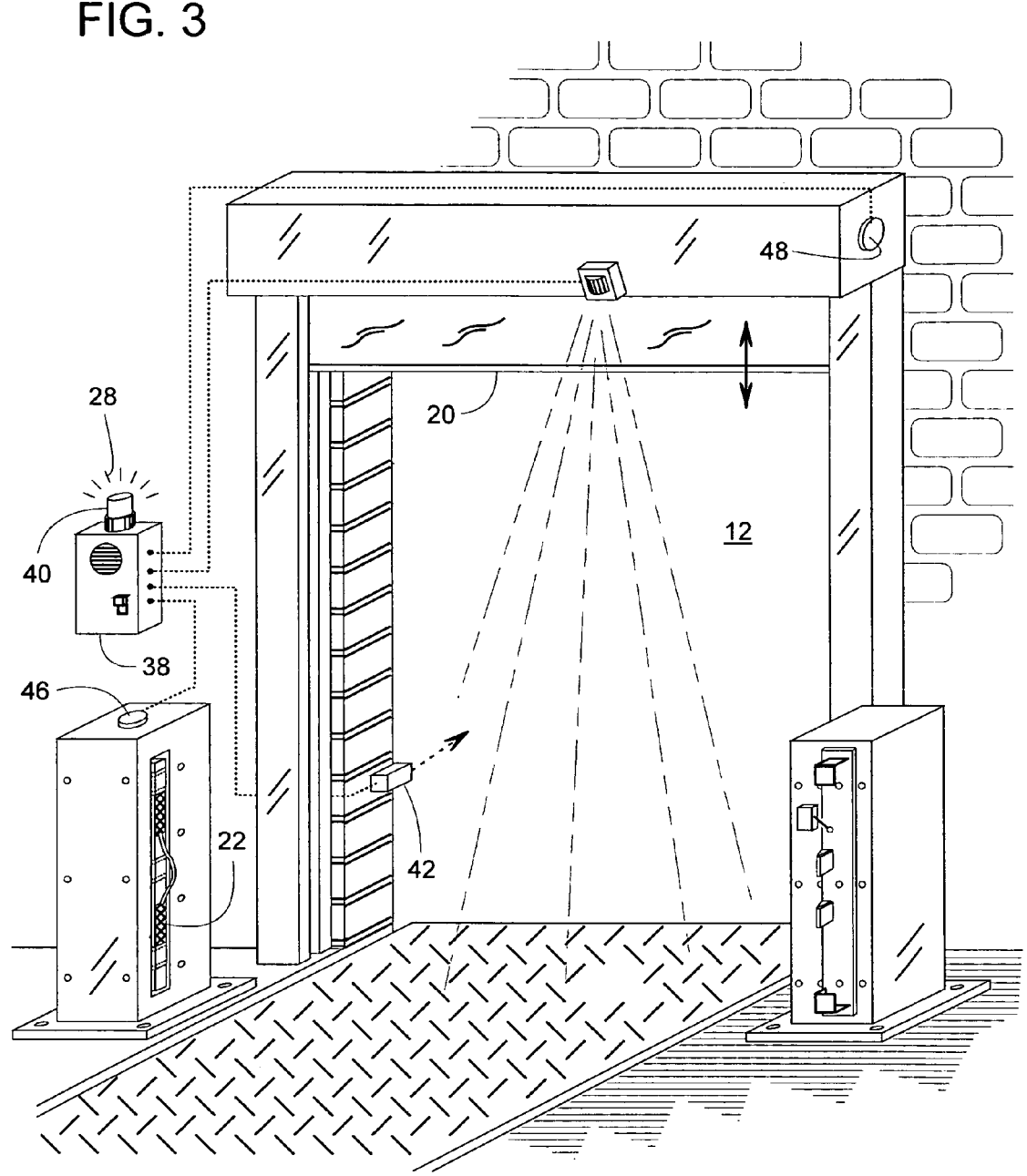
FIG. 3 is similar to FIG. 1 but without the truck at the dock, so the safety system provides an alarm signal (e.g., a light).

FIGS. 1-6 provide an inside view of a building 10 with a doorway 12 and a loading dock 14, wherein the loading dock is shown in various situations. Under certain conditions, a safety system 16 provides one or more alarm signals that warn of a potential falling hazard where someone or something could possibly fall off a raised platform 18 of dock 14. If a door 20 and a barrier 22, for instance, were left open while a truck 24 or other type of vehicle was not present at the dock, as shown in FIG. 3, an alarm system 26 (an alarm driven by a controller) could provide an audible or visual alarm signal 28 that could alert dockworkers in the area of the hazard. In some embodiments, system 26 may also provide a more pronounced audible or visual warning signal 30 (FIG. 6) to signify more imminent danger, such as a body 32 (person, forklift, etc.) being dangerously close to the exposed edge of platform 18.

The safety function can be achieved in numerous ways, so it should be appreciated that the embodiment of FIGS. 1-6 is just an illustrative example of the invention. The response of safety system 16 (alarm system 26 plus its sensors) depends on the situation that happens to exist at the dock.

FIG. 1, for example, shows door 20 being open while truck 24 is backed up against the dock. In this situation there may be no need for an alarm because truck 24 being present at the dock minimizes or eliminates the possibility of something falling off platform 18 and onto the driveway or falling off a conventional dock leveler 34 installed within the platform.

FIG. 2 shows door 20 closed where a door panel 36 covers doorway 12. With door 20 closed, an alarm may not be needed, unless there is still a concern for something breaking through the door.

FIG. 3 shows no truck present at the dock while door 20 is open. Since this presents a potential falling hazard, a controller 38 may be wired or programmed to energize an alarm 40 to produce an alarm signal 28 such as, for example, a red flashing light. Controller 38 may energize alarm 40 in response to a vehicle sensor 42 determining that truck 24 is not within a certain distance 44 of doorway 12 (see FIG. 9) and a barrier sensor 48 determining that door 20 is not closed. Sensor 48 is referred to as a "barrier sensor" because door 20 may be considered a barrier itself. In some embodiments, for example, barrier 22 is omitted, and door panel 36 alone (or in combination with added structure) serves as a runoff barrier.

Barrier sensor 48 for door 20 is schematically illustrated to represent any device for detecting a particular position of door panel 36. With further reference to FIG. 7, examples of barrier sensor 48 include, but are not limited to, an upper travel limit switch 48a, a lower travel limit switch 48b, a rotational switch (FIGS. 1-6), electromechanical switch, electromagnetic sensor, ultrasonic proximity sensor, limit switch, proximity switch, photoelectric eye, Hall Effect sensor, magnetic switch, etc.

Vehicle sensor 42 is schematically illustrated to represent any device for detecting that vehicle 24 is adjacent to or within certain distance 44 of doorway 12. Examples of vehicle sensor 42 include, but are not limited to, a rotational switch, electromechanical switch, a treadle switch 42a actuated by a truck tire 50 (FIG. 7), a switch 42b actuated by movement of a dock seal/shelter 52, a switch 42c actuated by movement of a vehicle restraint 54, a switch 42d actuated by movement of a bumper 56, a switch 42e actuated by movement of dock leveler 34, electromagnetic sensor, an ultrasonic proximity sensor 42f, limit switch, proximity switch, photoelectric eye, Hall Effect sensor, magnetic switch, etc.

In an alternate embodiment, controller 38 may be wired or programmed to energize alarm 40 when vehicle sensor 42 determines that a truck is not present at the dock while a barrier sensor 46 establishes that barrier 22 is in a nonblocking position. Barrier sensor 46 is schematically illustrated to represent any device for detecting a particular position of barrier 22. Again with further reference to FIG. 7, examples of barrier sensor 46 include, but are not limited to, a travel limit switch 46a, a rotational switch on a take-up drum (FIGS. 1-6), electromechanical switch, electromagnetic sensor, ultrasonic proximity sensor, proximity switch, photoelectric eye, Hall Effect sensor, magnetic switch, etc. Barrier sensor 46 can be installed on a first stanchion 60 supporting barrier 22, or a barrier sensor 46b could be installed on a second stanchion 64 of barrier 22.

In yet another alternative, controller 38 may be wired or programmed to energize alarm 40 in response to vehicle sensor 42 determining that truck 24 is not present or within a certain distance 44 of doorway 12 (see FIG. 9) and barrier sensor 48 determining that door 20 is not closed. Moreover, it should be appreciated that the depicted location of sensor 42 for this and the other embodiments is for descriptive purposes only, and other locations for sensor 42 such as mounting it externally to the building adjacent the dock may be preferred.

Figure 4:
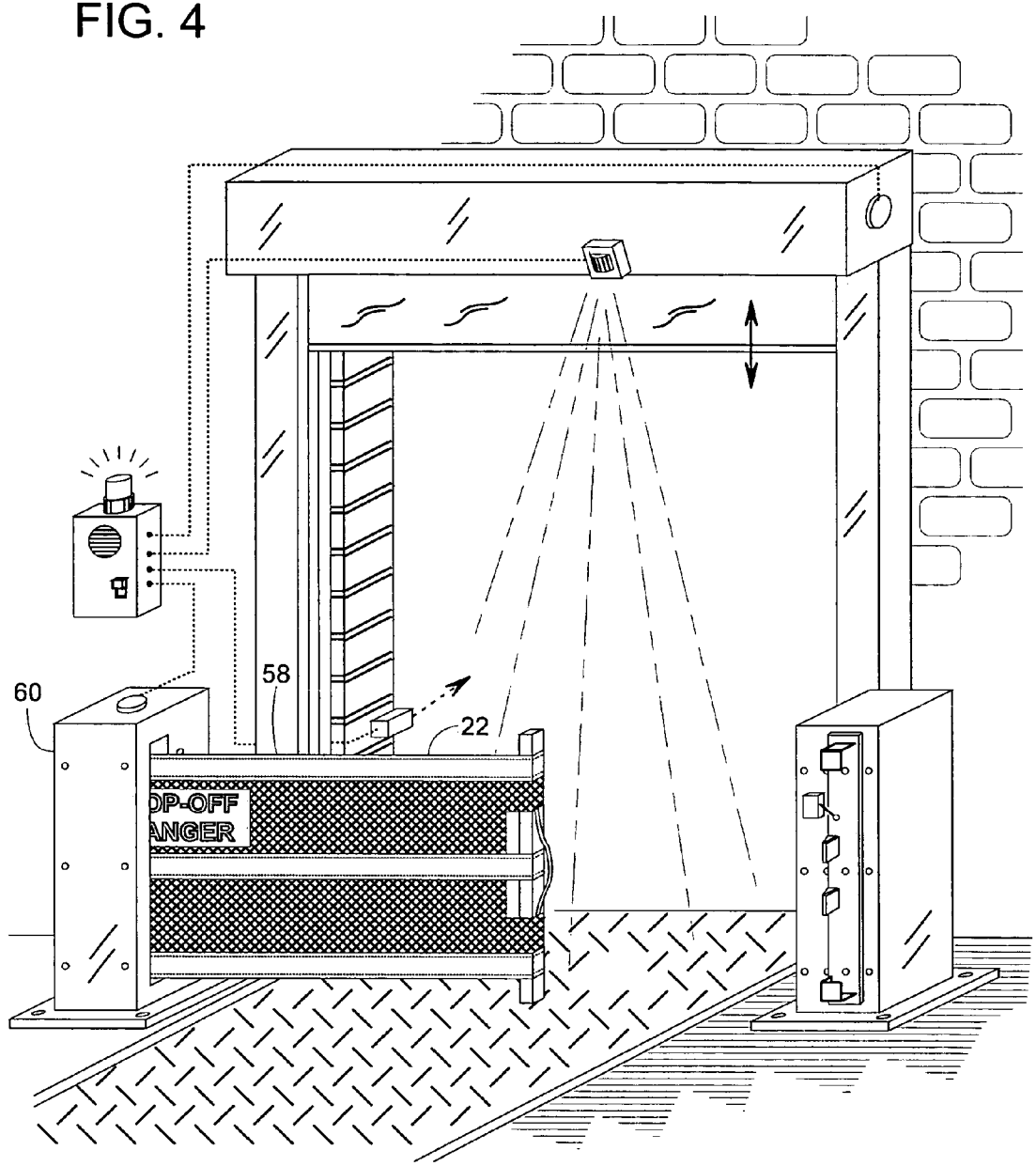
FIG. 4 is similar to FIG. 3 but showing the barrier being closed.
Figure 5:
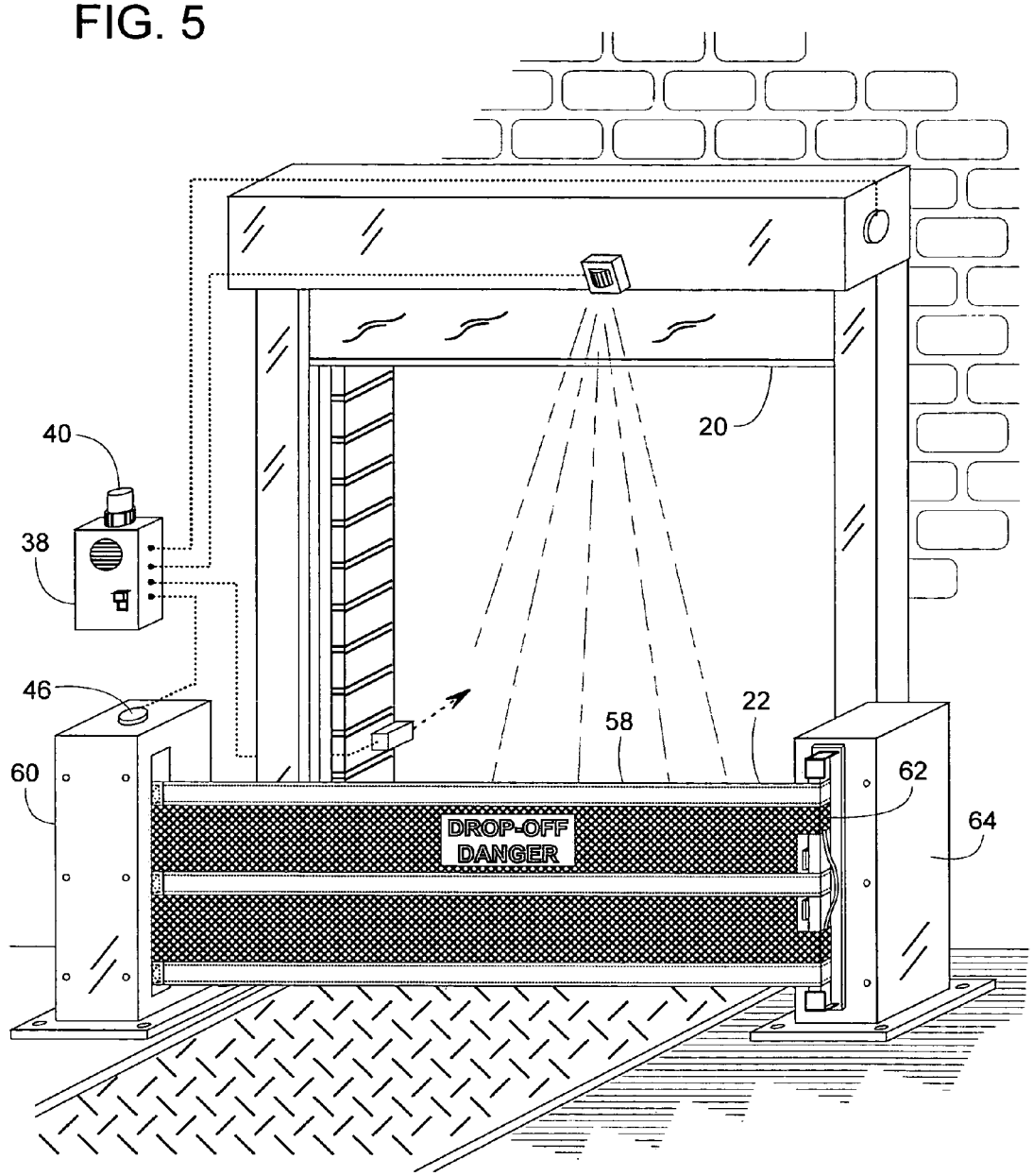
FIG. 5 is similar to FIG. 4 but showing the barrier closed.

FIG. 4 shows barrier 22 being moved from its nonblocking position of FIG. 3 to its blocking position of FIG. 5. In the blocking position, barrier 22 obstructs the open doorway to help prevent something from falling through it. Although many different types of barriers would work, in this particular example barrier 22 is a tough fabric panel 58 that can be moved between blocking and nonblocking positions. In the nonblocking position of FIG. 3, panel 58 wraps about a spring-loaded, rotatable drum supported within first stanchion 60. In the blocking position of FIG. 5, one end 62 of panel 58 hooks onto second stanchion 64 so that panel 58 provides a taut protective fence between stanchions 60 and 64.

In FIG. 5, controller 38 de-energizes alarm 40 in response to barrier sensor 46 determining that barrier 58 is in its blocking position where the barrier minimizes or eliminates the falling hazard.

Figure 6:
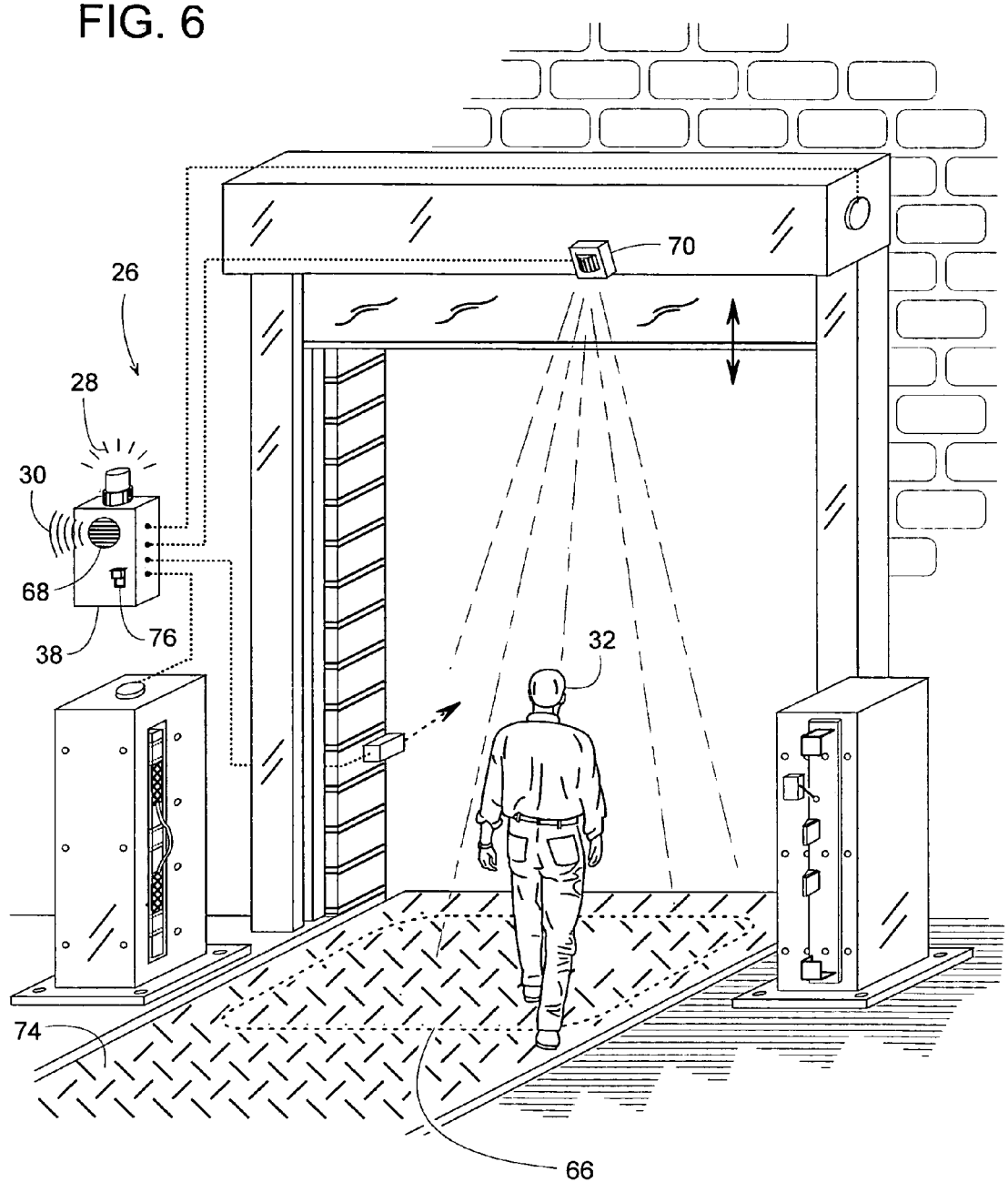
FIG. 6 is similar to FIG. 3 but with a person within a predetermined distance of the edge of the platform, so the safety system provides a more pronounced warning signal (e.g., a buzzer).
Figure 7:
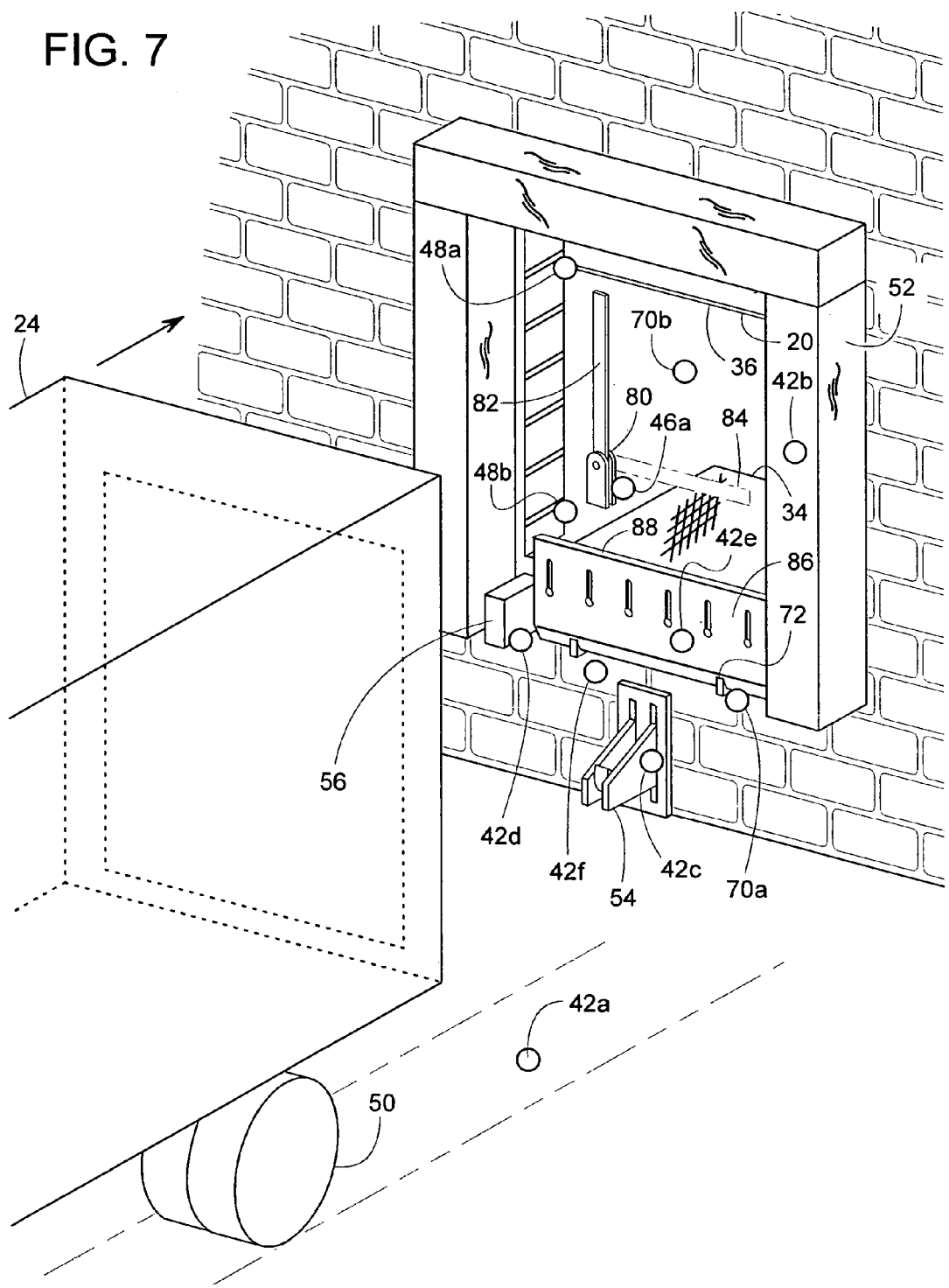
FIG. 7 is a perspective view of a safety system, wherein the view is taken from outside the building, and the drawing schematically shows numerous sensors installed at various locations.

FIG. 6 shows how safety system 26 could be configured to respond when the falling hazard poses more imminent danger, such as when body 32 approaches the open doorway. To achieve this functionality, when body 32 comes within a certain area 66 adjacent to the doorway 12 when door 20 is open, no truck is present, and barrier 22 is in its unobstructed position, controller 38 energizes an alarm 68 to create warning signal 30 that is audible or otherwise distinguishable from alarm signal 28. Controller 38 energizes alarm 68 in response to a remote body sensor 70, which is schematically illustrated to represent any device for determining whether body 32 is within area 66 (i.e., within a certain distance of the doorway). Examples of remote body sensor 70 include, but are not limited to a metal detector, motion detector, a weight detector 70a associated with dock leveler 34 (e.g., attached to a lip keeper 72) for sensing when the weight of a body is on the dock leveler's deck 74, infrared sensor, photoelectric eye that determines whether a body crosses its beam or line of sight, ultrasonic proximity sensor, electromagnetic radiation antenna, etc. Although FIGS. 1-6 show remote body sensor 70 installed in an overhead location, FIG. 7 indicates that a remote body sensor 70b can be installed at any location that would be appropriate for a particular type of sensor.

In some cases, controller 38 may include a disable switch 76 for disabling alarm 68 under certain conditions such as, for instance, when the door or other equipment in the area needs servicing. If the alarm system, for example, includes both a visual signal and an audible signal, switch 76 can be configured to silence the audible signal but still permit the actuation of the visual signal.

Figure 8:
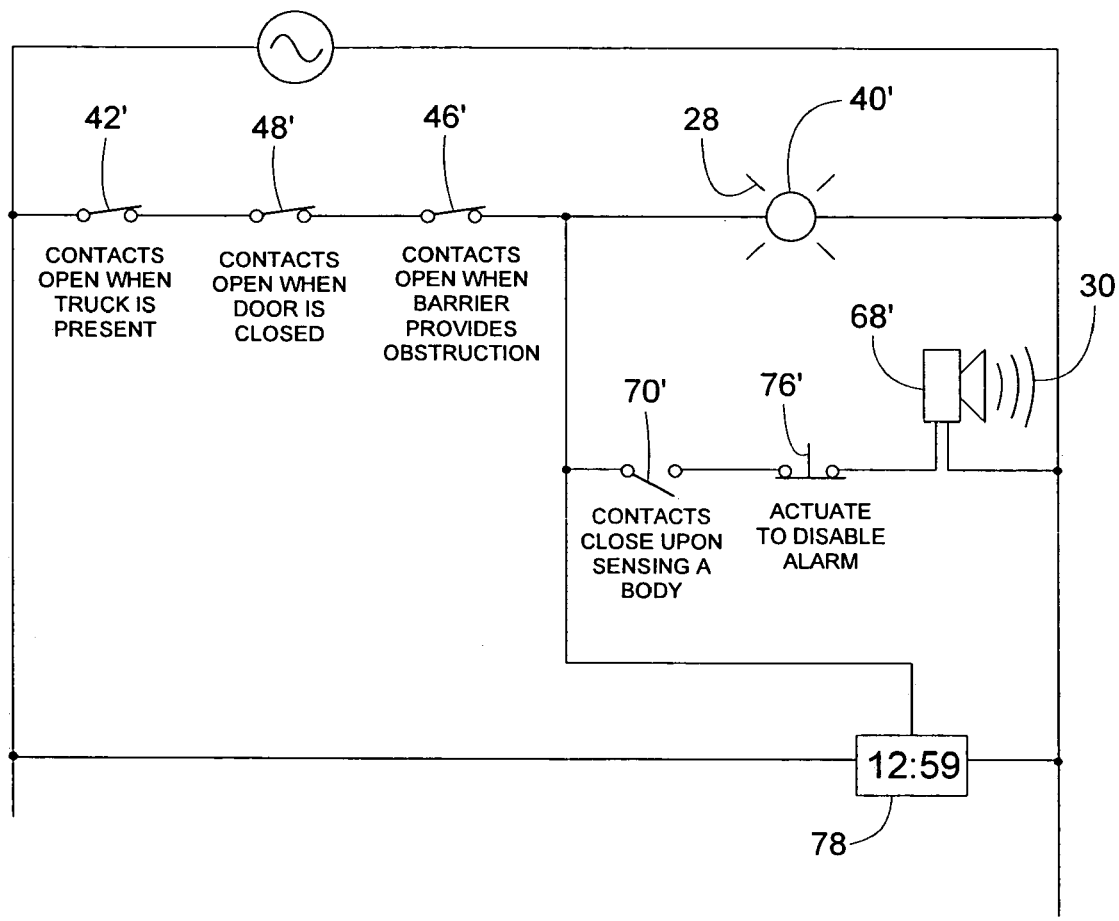
FIG. 8 is ladder diagram illustrating just one of many conceivable ways for controlling the safety system of FIG. 1.

FIG. 8 shows just one example of many possible control schemes that could achieve the results just described. The various elements of FIG. 8 are schematic symbols or representations of what could correspond to vehicle sensor 42, barrier sensor 48, barrier sensor 46, body sensor 70, disable switch 76, alarm 40, and alarm 68, wherein 42' corresponds to 42, 48' corresponds to 48, etc. In FIG. 8, the various sensors or switches are shown in their "normal" positions when truck 24 in not present (normally closed contacts of sensor 42' are closed), door 20 is open (normally closed contacts of sensor 48' are closed), barrier 22 is in its nonblocking position (normally closed contacts of sensor 46' are closed), body 32 is not within area 66 (normally open contacts of sensor 70' are open), and disable switch 76' is in its normally closed position. Controller 38 energizes visual alarm 40' until at least one of the following occurs: the arrival of truck 24 opens the contacts of vehicle sensor 42', door 20 closes to open the contacts of barrier sensor 48', or barrier 22 closes to open the contacts of barrier sensor 46'. In cases where the barrier is provided by the door itself, barrier sensor 46' is omitted (or short circuited). If in addition to visual alarm 40' being energized, body 32 enters area 66 to close the contacts of remote body sensor 70', controller 38 also energizes audible alarm 68'. A clock 78 may be added to establish a timestamp that identifies when alarm 68' (and/or alarm 40') was activated, which can be useful for investigating an accident.

Figure 9:
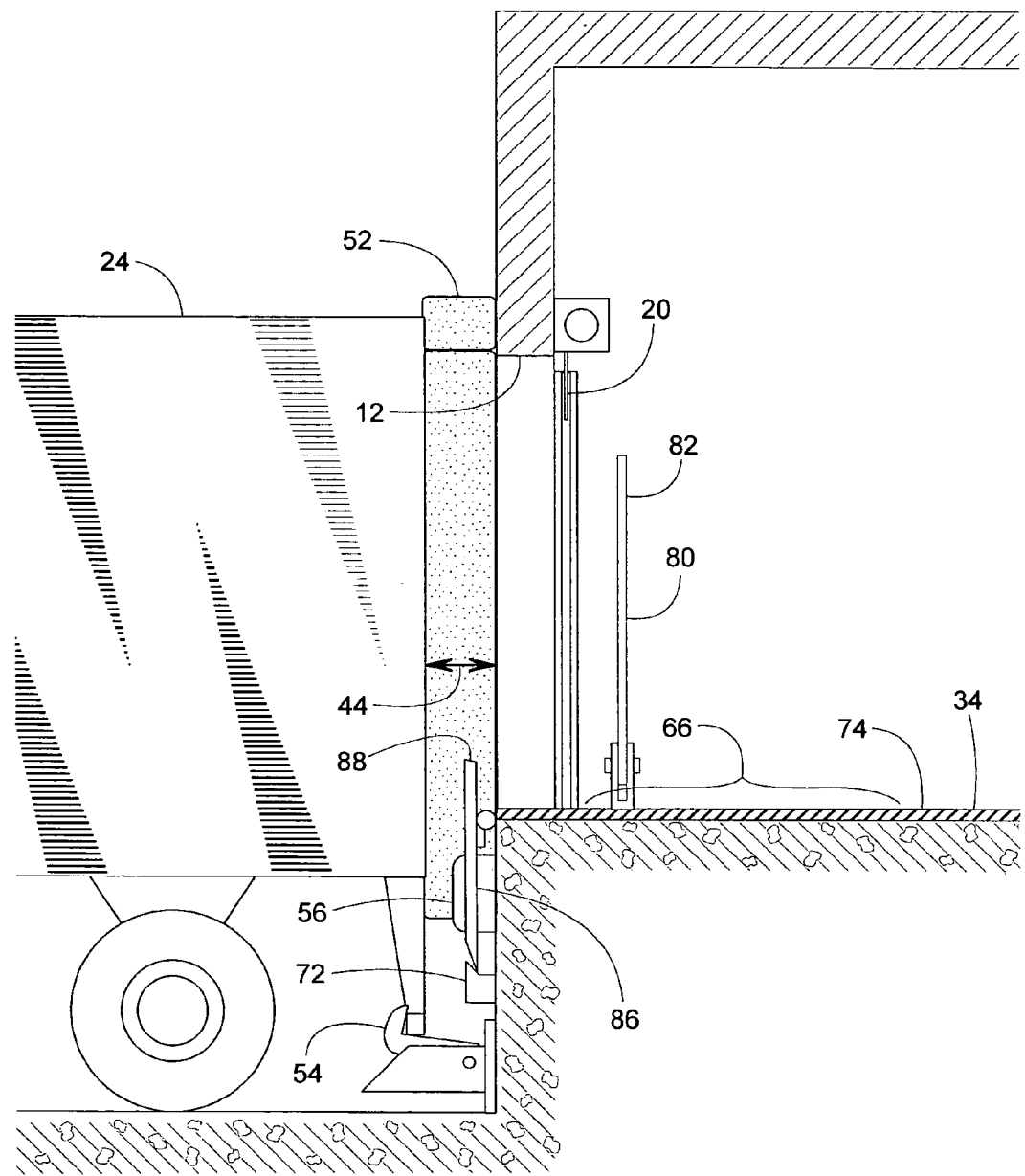
FIG. 9 is a cross-sectional side view of a loading dock similar to FIG. 1 but with a pivotal barrier and a vehicle restraint engaging a truck.
Figure 10:
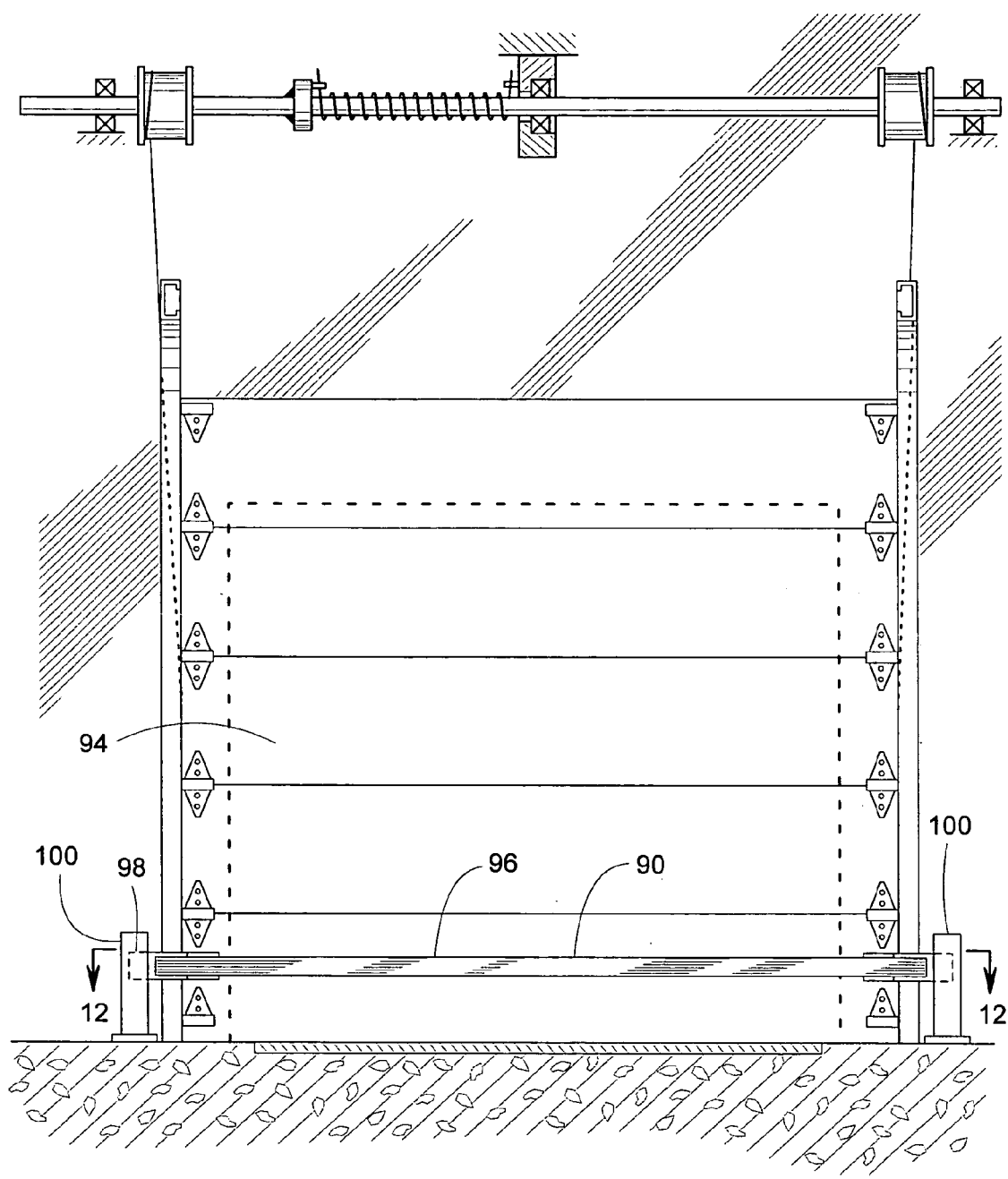
FIG. 10 is a view from inside a building showing another type of door with a door-mounted barrier.

FIGS. 7 and 9 shows another example of a barrier 80, wherein barrier 80 includes an arm 82 that pivots between a blocking position (phantom line 84 in FIG. 7) and a nonblocking position (solid lines in FIGS. 7 and 9). FIGS. 7 and 9 also show dock leveler 34 having a lip 86 whose upper edge 88 can be used as a barrier for preventing accidental runoff, particularly for material handling equipment. An example of such a dock leveler is disclosed in U.S. Pat. No. 4,920,598, which is specifically incorporated by reference herein. If either of these barriers were used in a safety system as disclosed herein, there would be an associated sensor or sensing scheme (e.g., sensor 46a of FIG. 7) to determine whether the barrier is or is not in a blocking position.

Figure 11:
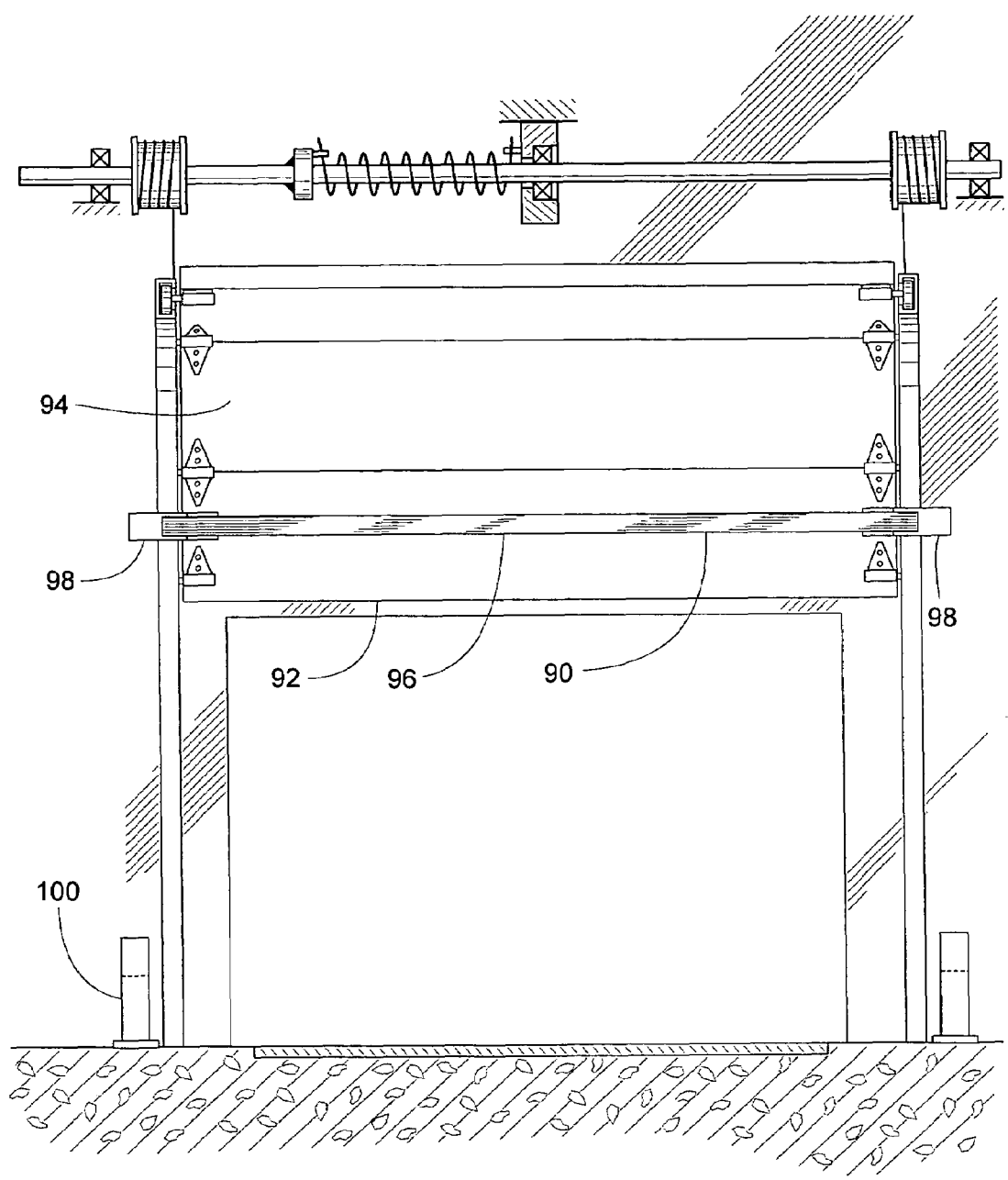
FIG. 11 is similar to FIG. 10 but with the door open.
Figure 12:
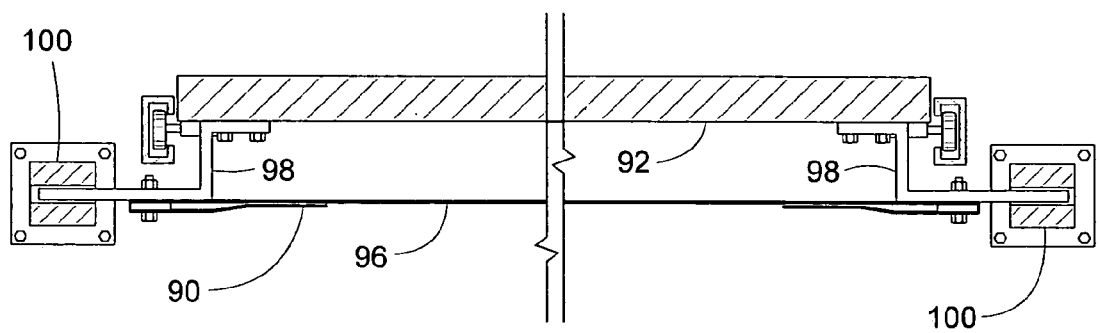
FIG. 12 is a cross-sectional view taken along line 12-12 of FIG. 10.
Figure 13:
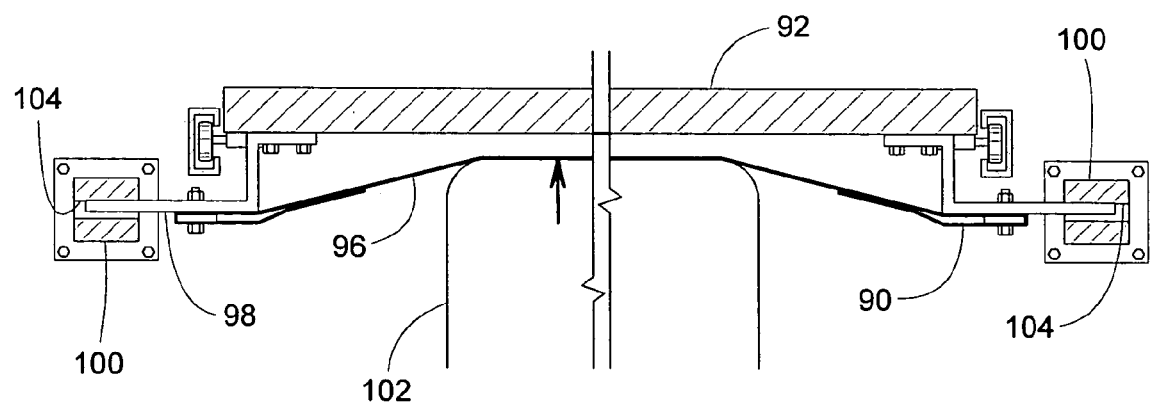
FIG. 13 is similar to FIG. 12 but showing a remote body (e.g., a forklift) impacting the barrier on the door.

FIGS. 10-13 show how a shock absorbing barrier 90 can be mounted directly to a door panel 92 so that opening and closing door 94 moves barrier 90 between its blocking position (FIGS. 10, 12 and 13) to its unblocking position (FIG. 11). In this example, barrier 90 comprises a nylon strap 96 held taut between two door-mounted brackets 98. When door 94 closes to move barrier 90 to its blocking position, brackets 98 engage two stanchions 100 so that when a body 102, such as a forklift, accidentally runs into strap 96 as shown in FIG. 13, brackets 98 transfer the force of impact into stanchions 100 to help protect door panel 92 from experiencing the full impact. Slots 104 in stanchions 100 permit door 94 to lift barrier 90 out from within the stanchions. An associated sensor is capable of sensing when barrier 90 is in its blocking position, consistent with the previous embodiments.

Although the invention is described with reference to preferred embodiments, it should be appreciated by those of ordinary skill in the art that various modifications are well within the scope of the invention. Therefore, the scope of the invention is to be determined by reference to the following claims:

The invention claimed is:

1. A safety system for a building that includes a doorway adapted to receive a vehicle and which has a barrier associated therewith that is movable between a blocking position for obstructing at least part of the doorway to help protect a remote body inside the building and a nonblocking position for less obstruction, the safety system comprising:

a vehicle sensor disposed adjacent the doorway, wherein the vehicle sensor determines the presence of the vehicle adjacent the doorway;

a barrier sensor disposed adjacent the doorway, wherein the barrier sensor determines whether the barrier is at the blocking position; and an alarm system responsive to the barrier sensor and the vehicle sensor, wherein the alarm system provides an alarm signal in response to the barrier sensor determining that the barrier is not at the blocking position and the vehicle sensor determining that the vehicle is not present adjacent the doorway.

2. The safety system of claim 1, wherein the building includes a door panel that not only opens and closes the doorway but also serves as the barrier.

3. The safety system of claim 1, wherein the vehicle sensor determines the presence of the vehicle by determining whether the vehicle is within a certain distance of the doorway.

4. The safety system of claim 1, wherein the building includes a door panel for opening and closing the doorway, and the barrier can move relative to the door panel.

5. The safety system of claim 1, wherein the building includes a door panel for opening and closing the doorway, and the barrier is coupled to the door panel.

6. The safety system of claim 1, further comprising a dock leveler adjacent to the doorway, wherein the barrier is part of the dock leveler.

7. The safety system of claim 1, wherein the alarm system includes a disable switch, and the alarm signal includes a visual signal and an audible signal, wherein the disable switch is operatively connected to silence the audible signal.

8. The safety system of claim 1, further comprising a remote body sensor that determines whether the remote body inside the building is within a certain area adjacent to the doorway, wherein the alarm system is further responsive to the remote body sensor to provide a warning signal in response to a concurrence of the barrier not being at the blocking position, the vehicle not being present adjacent the doorway, and the remote body being within the certain area adjacent to the doorway.

9. The safety system of claim 8, wherein the alarm signal is visual and the warning signal is audible, whereby the alarm signal indicates when a potentially hazardous situation may exist at the loading dock, and the warning signal indicates when more imminent danger may exist.

10. A safety system for a building that includes a doorway, wherein the doorway is adapted to receive a vehicle and which has a barrier associated therewith that is movable between a blocking position obstructing the doorway to help protect a remote body inside the building and a nonblocking position exposing the doorway, the safety system comprising:

a vehicle sensor disposed adjacent the doorway, wherein the vehicle sensor determines the presence of the vehicle adjacent the doorway;

a barrier sensor disposed adjacent the doorway, wherein the barrier sensor determines whether the barrier is at the blocking position;

a remote body sensor that determines whether the remote body inside the building is within a certain area adjacent to the doorway; and an alarm system responsive to the barrier sensor, the vehicle sensor, and the remote body sensor such that:
i. the alarm system provides an alarm signal in response to the barrier sensor and the vehicle sensor determining that the barrier is not at the blocking position and the vehicle is not present adjacent the doorway, and
ii. the alarm system provides a warning signal in response to a concurrence of the barrier not being at the blocking position, the vehicle not being present adjacent the doorway, and the remote body being within the certain area adjacent to the doorway, wherein the alarm signal is distinguishable from the warning signal.

11. The safety system of claim 10, wherein the vehicle sensor determines the presence of the vehicle by determining whether the vehicle is within a certain distance of the doorway.

12. The safety system of claim 10, wherein the alarm signal is visual and the warning signal is audible, whereby the alarm signal indicates when a potentially hazardous situation may exist at the loading dock, and the warning signal indicates when more imminent danger may exist.

* * * * *